(12) United States Patent
Sorensen et al.

(10) Patent No.: US 6,190,599 B1
(45) Date of Patent: Feb. 20, 2001

(54) REMOVAL OF INJECTION-MOLDED TIE FROM MOLD BY MOVING CORE DISPOSED OUTSIDE OF ABUTMENT WALL OF TIE

(75) Inventors: Soren Christian Sorensen; Jens Ole Sorensen, both of Cayman Kai (KN)

(73) Assignee: GB Electrical, Inc., Milwaukee, WI (US)

( * ) Notice: Under 35 U.S.C. 154(b), the term of this patent shall be extended for 620 days.

(21) Appl. No.: 08/584,606

(22) Filed: Jan. 8, 1996

(51) Int. Cl.⁷ ........................................ B29C 45/44
(52) U.S. Cl. .................. 264/318; 264/328.1; 264/334; 249/63; 425/556; 425/DIG. 58
(58) Field of Search ..................... 264/318, 334, 264/336, 328.1; 425/556, 577, 438, DIG. 58; 249/63, 64, 66, 98, 101

(56) References Cited

U.S. PATENT DOCUMENTS

| | | | |
|---|---|---|---|
| 1,916,692 | * 7/1933 | Scribner | 264/318 |
| 2,744,288 | * 5/1956 | Fienberg et al. | 425/438 |
| 2,875,472 | * 3/1959 | Marcus | 425/DIG. 58 |
| 3,049,758 | * 8/1962 | Drevalas | 425/438 |
| 3,660,869 | * 5/1972 | Caveney et al. | 24/16 PB |
| 3,924,299 | 12/1975 | McCormick | 24/16 PB |
| 3,940,103 | * 2/1976 | Hilaire | 425/438 |
| 4,125,246 | * 11/1978 | Von Holdt | 425/438 |
| 4,473,524 | 9/1984 | Paradis | 264/291 |
| 5,146,654 | 9/1992 | Caveney et al. | 24/16 PB |
| 5,389,330 | 2/1995 | Sorensen et al. | 264/328.1 |

* cited by examiner

*Primary Examiner*—Jill L. Heitbrink
(74) *Attorney, Agent, or Firm*—Edward W. Callan

(57) ABSTRACT

In a method of injection molding a tie that includes an abutment wall surface having at least one tooth inside a locking head facing a pawl, a movable core that defines at least a portion of a surface of the abutment wall that is on the opposite side of the abutment wall from the portion of the abutment surface that includes the at least one abutment surface tooth is moved to thereby enable the abutment wall to flex in a direction away from the pawl into a space vacated by movement of the core so that the tie can be removed from the mold without significantly damaging the at least one abutment surface tooth.

14 Claims, 1 Drawing Sheet

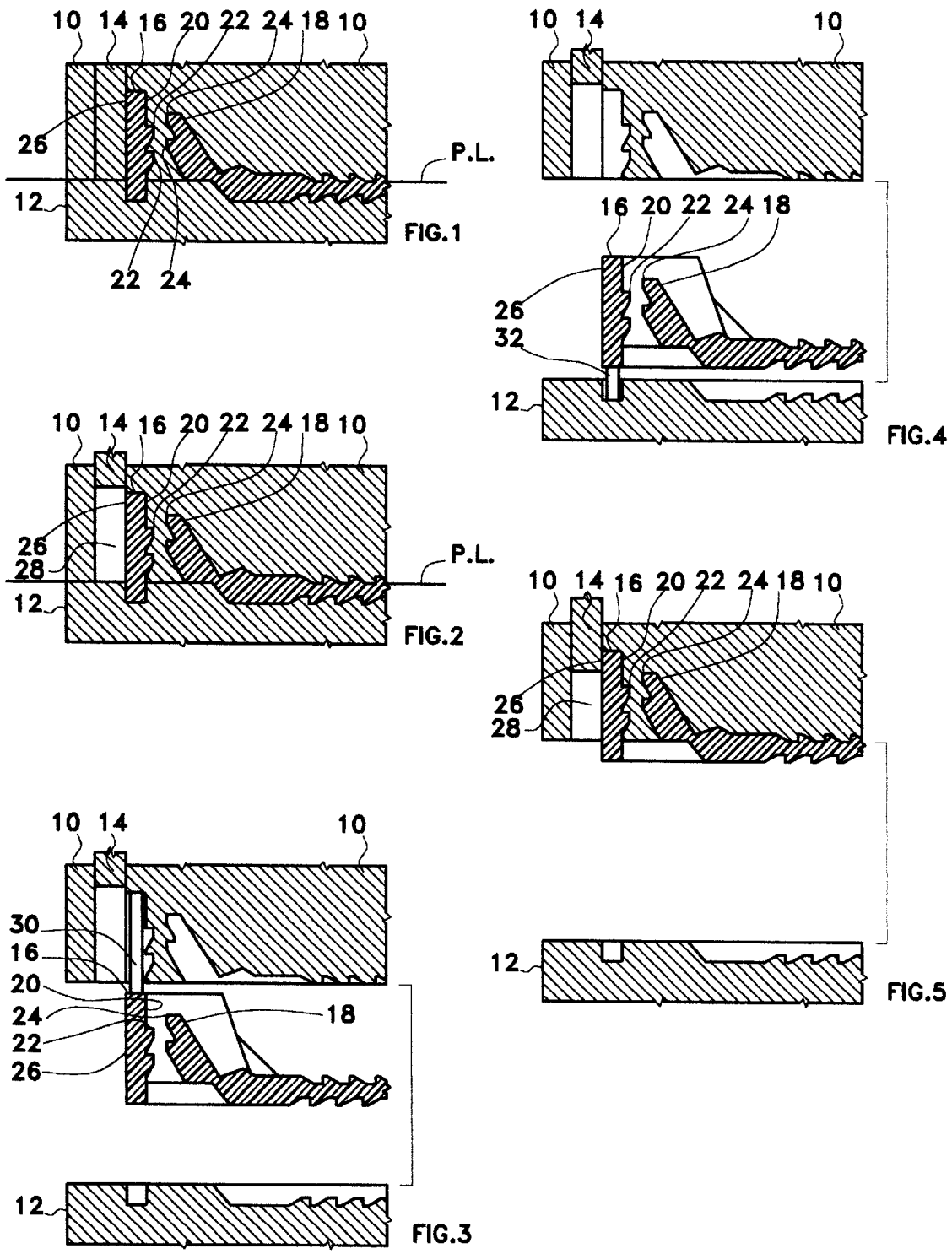

REMOVAL OF INJECTION-MOLDED TIE FROM MOLD BY MOVING CORE DISPOSED OUTSIDE OF ABUTMENT WALL OF TIE

BACKGROUND OF THE INVENTION

The present invention generally pertains to injection molding of a tie that is useful for forming a loop for retaining a bundle of elongated articles, such as cables. Such a tie is commonly known as a cable tie. The present invention is particularly directed to removal from the mold of a tie having at least one tooth on an abutment surface in the locking head of the tie.

One type of tie includes an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining a continuously bounded opening for receiving the tip of the tongue, the sides including a movable pawl that is hinged at one side of the opening and an abutment surface that is across the opening from the pawl, wherein the pawl has at least one pawl tooth disposed for engaging the first set of ratchet teeth when the tip of the tongue has been inserted through the opening with the first set of ratchet teeth facing the pawl, wherein the pawl, when the at least one pawl tooth is so engaged, is movable toward the abutment surface in response to pressure applied to the tongue in a direction opposite to the direction of insertion in order to force the second set of ratchet teeth against the abutment surface; and wherein at least one tooth is disposed on the abutment surface for engaging the second set of ratchet teeth when the tip of the tongue has been inserted through the opening with the second set of ratchet teeth facing the abutment surface and the side of the tongue including the second set of ratchet teeth is forced against the abutment surface by movement of the pawl. Such a tie is described in U.S. Pat. No. 4,473,524 to Paradis.

A prior art method of injection molding such a tie includes the steps of:

(a) providing a mold that includes mold parts for defining a cavity between the mold parts in the general shape of the tie;

(b) injecting molten plastic material into the mold cavity;

(c) solidifying the plastic material in the mold cavity to form the tie;

(d) separating the mold parts to enable removal of the tie from the mold; and (e) removing the tie from the mold.

When such a tie is formed by injection molding, it is difficult to remove the tie from the mold without significantly damaging the at least one tooth on the abutment surface unless the apex of the tooth is defined at a parting line between mold parts because the portion of the mold part that defines the abutment surface has a lateral dimension that is broader than the space between such tooth and the pawl, whereby withdrawal of such mold part from a parting line between mold parts compresses and thereby distorts such tooth.

SUMMARY OF THE INVENTION

The present invention provides a method of injection molding a tie, wherein the tie is removed from the mold without significantly damaging the at least one tooth on the abutment surface.

The present invention provides a method of injection molding a tie that includes an elongated tongue with two ends and two broad sides, a locking head at one end of the tongue, a first set of ratchet teeth extending along one broad side of the tongue and a second set of ratchet teeth extending along the other broad side of the tongue, wherein the locking head has sides defining a continously bounded opening for receiving the tongue, the sides include a movable pawl that is hinged at one side of said opening and an abutment wall that is across the opening from the pawl, and the pawl has at least one pawl tooth disposed for engaging the set of first ratchet teeth when the tongue has been inserted through said opening with the first set of ratchet teeth facing the pawl, wherein the paw l, when the at least one pawl tooth is so engaged, is movable toward an abutment surface of the abutment wall in response to pressure applied to the tongue in a direction opposite to the direction of said insertion in order to force the second set of ratchet teeth against the abutment surface; and wherein the abutment surface includes at least one tooth for locking engagement with the second set of ratchet teeth when the tongue has been inserted through the opening with the second set of ratchet teeth facing the abutment surface and the side of the tongue including the second set of ratchet teeth is forced against the abutment surface by movement of the pawl; the method comprising the steps of (a) providing a mold that includes mold parts for defining a cavity between the mold parts in the general shape of the tie;

(b) injecting molten plastic material into the mold cavity;

(c) solidifying the plastic material in the mold cavity to form the tie;

(d) separating the mold parts to enable removal of the tie from the mold; and (e) removing the tie from the mold;

wherein step (a) comprises providing a said mold in which one of the mold parts is a movable core that defines at least a portion of a surface of the abutment wall that is on the opposite side of the abutment wall from the portion of the abutment surface that includes the at least one abutment surface tooth; and wherein step (d) comprises the step of (f) moving the core to thereby enable the abutment wall to flex in a direction away from the pawl into a space vacated by movement of the core so that the tie can be removed from the mold pursuant to step (e) without significantly damaging the at least one abutment surface tooth.

Additional features of the present invention are described with reference to the detailed description of the preferred embodiments.

BRIEF DESCRIPTION OF THE DRAWING

FIG. 1 is a sectional view illustrating formation of the abutment surface portion of a tie in a mold utilized in preferred embodiments of the injection molding method of the present invention.

FIG. 2 is a sectional view illustrating movement of the core of the mold shown in FIG. 1 in accordance with one preferred embodiment of the injection molding method of the present invention.

FIG. 3 is a sectional view illustrating an embodiment in which the tie is ejected from a first mold part of the mold shown in FIG. 1 in accordance with the preferred embodiments of the injection molding method of the present invention shown in FIGS. 2 and 5.

FIG. 4 is a sectional view illustrating an alternative embodiment in which the tie is ejected from a second mold part of the mold shown in FIG. 1 in accordance with the preferred embodiment of the injection molding method of the present invention shown in FIG. 2.

FIG. 5 is a sectional view illustrating movement of the core of the mold shown in FIG. 1 in accordance with another preferred embodiment of the injection molding method of the present invention.

DETAILED DESCRIPTION

Referring to FIG. 1, in preferred embodiments of the method of the present invention, a tie of the type described above is injection molded in a mold including a first mold part 10, a second mold part 12 and a core mold part 14. When the mold is closed, as shown in FIG. 1, the first mold part 10, the second mold part 12 and the core mold part 14 define a cavity therebetween in the general shape of the tie, which includes an abutment wall 16 and a pawl 18. An abutment surface 20 of the abutment wall 16 includes at least one tooth 22 facing the pawl 18, and the pawl 18 includes at least one tooth 24 facing the abutment wall 16. The first mold part 10 defines the pawl 18 and at least one abutment surface tooth 22 on the abutment surface 20. When the mold is closed, the first mold part 10 joins the second mold part 12 at a parting line P.L. and the core mold part 14 also joins the second mold part 12 at the parting line P.L. Molten plastic material is injected into the mold cavity and solidified therein to form the tie.

The core mold part 14 is movable and is disposed when the mold is closed for defining at least a portion of an outside surface 26 of the abutment wall 16 that is on the opposite side of the abutment wall 16 from the portion of the abutment surface 20 that includes the at least one abutment surface tooth 22. Preferably, the core mold part 14 does not define any portion of the abutment surface 20. The core mold part 14 is moved in such a manner that when the tie is removed from the first mold part 10, the abutment wall 16 is able to flex in a direction away from the pawl 18 into a space 28 vacated by movement of the core mold part 14 so that the tie can be removed from the mold without significantly damaging the at least one abutment surface tooth 22. The tie is then removed from the mold.

In one preferred embodiment, as shown in FIG. 2, the core mold part 14 is moved in relation to the first mold part 10 while the first mold part 10 remains in contact with the second mold part 12. After the core mold part 14 has been moved by such a distance that the core mold part 14 no longer is disposed adjacent the portion of the outside surface 26 of the abutment wall 16 that is on the opposite side of the abutment wall 16 from the portion of the abutment surface 20 that includes the at least one abutment surface tooth 22, the abutment wall 16 is able to flex in a direction away from the pawl 18 into the space 28 vacated by movement of the core mold part 14.

The first mold part 10 is then separated from the second mold part 12 in a direction normal to at least a portion of the parting line P.L. with the tie being retained in the first mold part 10 and/or the second mold part 12. When the tie is retained in the first mold part 10, as shown in FIG. 3, the tie is ejected from the first mold part 10 by protraction of ejector pins 30. As the tie is being ejected from the first mold part 10, the abutment wall 16 flexes in a direction away from the pawl 18 into the space 28 vacated by prior movement of the core mold part 14, whereby the tie is removed from the mold without significantly damaging the at least one abutment surface tooth 22.

When the tie is retained in the second mold part 12, as the first mold part 10 is being separated from the second mold part 12, the abutment wall 16 flexes in a direction away from the pawl 18 into the space 28 vacated by prior movement of the core mold part 14, whereby the tie is removed from the mold without significantly damaging the at least one abutment surface tooth 22. The tie is ejected from the second mold part 12 by protraction of ejector pins 32, as shown in FIG. 4.

In one version of the embodiment of the method in which the core mold part 14 is moved in relation to the first mold part 10 while the first mold part 10 remains in contact with the second mold part 12, movement of the core mold part 14 is completed before separation of the first mold part 10 from the second mold part 12 commences. In another version of the embodiment of the method in which the core mold part 14 is moved in relation to the first mold part 10 while the first mold part 10 remains in contact with the second mold part 12, separation of the first mold part 10 from the second mold part 12 commences before movement of the core mold part 14 is completed.

In another preferred embodiment, as shown in FIG. 5, the core mold part 14 is moved in relation to the first mold part 10 not sooner than when the first mold part 10 is separated from the second mold part 12. The first mold part 10 is separated from the second mold part 12 in a direction normal to at least a portion of the parting line P.L. with the tie being retained in the first mold part 10. After the core mold part 14 has been moved by such a distance that the core mold part 14 no longer is disposed adjacent the portion of the outside surface 26 of the abutment wall 16 that is on the opposite side of the abutment wall 16 from the portion of the abutment surface 20 that includes the at least one abutment surface tooth 22, the abutment wall 16 is able to flex in a direction away from the pawl 18 into the space 28 vacated by movement of the core mold part 14.

The tie is then ejected from the first mold part 10 by protraction of ejector pins 30, as shown in FIG. 3. As the tie is being ejected from the first mold part 10, the abutment wall 16 flexes in a direction away from the pawl 18 into the space 28 vacated by the movement of the core mold part 14, whereby the tie is removed from the mold without significantly damaging the at least one abutment surface tooth 22.

In one version of the embodiment of the method in which the core mold part 14 is moved in relation to the first mold part 10 not sooner than when the first mold part 10 is separated from the second mold part 12, separation of the first mold part 1 from the second mold part 12 is completed before the core mold part 14 is moved in relation to the first mold part 10. In another version of the embodiment of the method in which the core mold part 14 is moved in relation to the first mold part 10 not sooner than when the first mold part 10 is separated from the second mold part 12, separation of the first mold part 1 from the second mold part 12 is not before movement of the core mold part 14 in relation to the first mold part 10 commences.

In alternative preferred embodiments (not shown), a mold is provided in which (a) the core mold part is movable in any other possible direction than that shown in the Drawing through and/or between any other mold part or parts from a position adjacent the portion of the outside surface of the abutment wall that is on the opposite side of the abutment wall from the portion of the abutment surface that includes the at least one abutment surface tooth; and/or (b) the core mold part is moved through a portion of a mold part that does not define the portion of the abutment surface that includes the at least one abutment surface tooth.

The advantages specifically stated herein do not necessarily apply to every conceivable embodiment of the present invention. Further, such stated advantages of the present invention are only examples and should not be construed as the only advantages of the present invention. While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

What is claimed is:

1. A method of injection molding a tie that includes an elongated tongue with two ends and two broad sides, a locking head at one end of the tongue, a first set of ratchet teeth extending along one broad side of the tongue and a second set of ratchet teeth extending along the other broad side of the tongue, wherein the locking head has sides defining a continuoulsy bounded opening for receiving the tongue, the sides include a movable pawl that is hinged at one side of said opening and an abutment wall that is across the opening from the pawl, and the pawl has at least one pawl tooth disposed for engaging the set of first ratchet teeth when the tongue has been inserted through said opening with the first set of ratchet teeth facing the pawl, wherein the pawl, when the at least one pawl tooth is so engaged, is movable toward an abutment surface of the abutment wall in response to pressure applied to the tongue in a direction opposite to the direction of said insertion in order to force the second set of ratchet teeth against the abutment surface; and wherein the abutment surface includes at least one tooth for locking engagement with the second set of ratchet teeth when the tongue has been inserted through the opening with the second set of ratchet teeth facing the abutment surface and the side of the tongue including the second set of ratchet teeth is forced against the abutment surface by movement of the pawl; the method comprising the steps of (a) providing a mold that includes mold parts for defining a cavity between the mold parts in the general shape of the tie;

(b) injecting molten plastic material into the mold cavity;

(c) solidifying the plastic material in the mold cavity to form the tie;

(d) separating the mold parts to enable removal of the tie from the mold; and (e) removing the tie from the mold;

wherein step (a) comprises providing a said mold in which one of the mold parts is a movable core that defines at least a portion of a surface of the abutment wall that is on the opposite side of the abutment wall from the portion of the abutment surface that includes the at least one abutment surface tooth; and wherein step (d) comprises the step of (f) moving the core to thereby enable the abutment wall to flex in a direction away from the pawl into a space vacated by movement of the core so that the tie can be removed from the mold pursuant to step (e) without significantly damaging the at least one abutment surface tooth.

2. A method according to claim 1, wherein step (f) comprises moving the core in relation to a first other mold part while the first other mold part remains in contact with a second other mold part.

3. A method according to claim 2, wherein step (e) comprises ejecting the tie from the first other mold part.

4. A method according to claim 2, wherein step (e) comprises ejecting the tie from the second other mold part.

5. A method according to claim 2, wherein the first and second other mold parts are joined at a parting line and step (d) comprises separating the first and second other mold parts in a direction normal to at least a portion of the parting line.

6. A method according to claim 1, wherein step (f) comprises moving the core in relation to a first other mold part that defines the at least one abutment surface tooth while the first other mold part remains in contact with a second other mold part.

7. A method according to claim 6, wherein step (e) comprises ejecting the tie from the first other mold part.

8. A method according to claim 6, wherein step (e) comprises ejecting the tie from the second other mold part.

9. A method according to claim 1, wherein step (f) comprises moving the core in relation to a first other mold part not sooner than the first other mold part is separated from a second other mold part.

10. A method according to claim 9, wherein step (e) comprises ejecting the tie from the first other mold part.

11. A method according to claim 9, wherein the first and second other mold parts are joined at a parting line and step (d) comprises separating the first and second other mold parts in a direction normal to at least a portion of the parting line.

12. A method according to claim 1, wherein step (f) comprises moving the core in relation to a first other mold part that defines the at least one abutment surface tooth not sooner than the first other mold part is separated from a second other mold part.

13. A method according to claim 13, wherein step (e) comprises ejecting the tie from the first other mold part.

14. A method according to claim 1, wherein said core does not define the abutment surface.

* * * * *